(12) United States Patent
Hua et al.

(10) Patent No.: US 10,834,707 B2
(45) Date of Patent: Nov. 10, 2020

(54) SCHEDULING A DATA CHANNEL CORRESPONDING TO A CONTROL CHANNEL

(71) Applicant: Huawei Technologies Co., Ltd., Shenzhen (CN)

(72) Inventors: Meng Hua, Shanghai (CN); Wenquan Hu, Lund (SE); Shurong Jiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 16/146,190

(22) Filed: Sep. 28, 2018

(65) Prior Publication Data

US 2019/0037552 A1    Jan. 31, 2019

Related U.S. Application Data

(63) Continuation of application No. PCT/CN2016/078185, filed on Mar. 31, 2016.

(51) Int. Cl.
*H04W 72/04* (2009.01)
*H04W 72/12* (2009.01)

(52) U.S. Cl.
CPC ... *H04W 72/0406* (2013.01); *H04W 72/1205* (2013.01); *H04W 72/1263* (2013.01); *H04W 72/044* (2013.01); *H04W 72/1289* (2013.01)

(58) Field of Classification Search
CPC .......... H04W 72/0406; H04W 72/044; H04W 72/1205; H04W 72/1263; H04W 72/1289;
(Continued)

(56) References Cited

U.S. PATENT DOCUMENTS

| 9,538,527 B2 * | 1/2017 | Yan ................. H04W 72/0446 |
| 2010/0014490 A1 | 1/2010 | Kishiyama et al. |

(Continued)

FOREIGN PATENT DOCUMENTS

| CN | 102325018 A | 1/2012 |
| CN | 103378932 | 10/2013 |

(Continued)

OTHER PUBLICATIONS

"Short TTI for UL transmissions," 3GPP TSG RAN WG1 Meeting #84, St. Julian's, Malta, R1-160294, XP051053634, pp. 1-4, 3rd Generation Partnership Project, Valbonne, France (Feb. 2016).

(Continued)

*Primary Examiner* — Mewale A Ambaye
(74) *Attorney, Agent, or Firm* — Leydig, Voit & Mayer, Ltd.

(57) ABSTRACT

Method is provided, including: determining, by a base station, a current time period in which an end moment of a current control channel is located in a first transmission time interval TTI, where the first TTI includes at least two time periods, and a start moment of a data channel corresponding to a control channel that ends in each of the at least two time periods is located in a different TTI; sending, by the base station to user equipment in the first TTI, control information carried on the current control channel, where the control information is configured to schedule a current data channel corresponding to the current control channel; determining, by the base station, a second TTI in which a start moment of the current data channel is located; and exchanging, by the base station, data of the current data channel with the user equipment in the second TTI.

20 Claims, 9 Drawing Sheets

(58) Field of Classification Search
CPC .. H04W 28/18; H04W 72/0433; H04W 92/12
See application file for complete search history.

(56) References Cited

U.S. PATENT DOCUMENTS

| | | | | |
|---|---|---|---|---|
| 2013/0142138 | A1* | 6/2013 | Dinan | H04L 5/0044 370/329 |
| 2013/0242882 | A1 | 9/2013 | Blankenship et al. | |
| 2014/0307718 | A1* | 10/2014 | Tie | H04W 52/325 370/336 |
| 2015/0146634 | A1* | 5/2015 | Hwang | H04L 1/0026 370/329 |
| 2015/0350941 | A1* | 12/2015 | You | H04W 84/045 370/252 |
| 2015/0351093 | A1 | 12/2015 | Au et al. | |
| 2016/0013906 | A1* | 1/2016 | Guo | H04L 5/0073 370/329 |
| 2017/0359849 | A1* | 12/2017 | Zhang | H04W 76/28 |
| 2018/0351704 | A1* | 12/2018 | Papasakellariou | H04L 5/0053 |

FOREIGN PATENT DOCUMENTS

| | | |
|---|---|---|
| EP | 2744122 A2 | 6/2014 |
| WO | 2015157565 A1 | 10/2015 |

OTHER PUBLICATIONS

"Short TTI for DL transmissions," 3GPP TSG RAN WG1 Meeting #84, St. Julian's, Malta, R1-160292, XP051053632, pp. 1-8, 3rd Generation Partnership Project, Valbonne, France (Feb. 2016).

"DL aspects of TTI shortening," 3GPP TSG RAN WG1 Meeting #84, St. Julian's, Malta, R1-160964, XP051054271, pp. 1-8, 3rd Generation Partnership Project, Valbonne, France (Feb. 2016).

"On required physical layer enhancements for TTI shortening," 3GPP TSG-RAN WG1 Meeting #83, Anaheim, USA, R1-157294, 3rd Generation Partnership Project, Valbonne, France (Nov. 15-22, 2015).

"Control signaling enhancements for short TTI," 3GPP TSG RAN WG1 Meeting #83, Anaheim, USA, R1-156461, 3rd Generation Partnership Project, Valbonne, France (Nov. 15-22, 2015).

"Design of DL DCI for short TTI," 3GPP TSG RAN WG1 Meeting #84 Malta, R1-160931, 3rd Generation Partnership Project, Valbonne, France (Feb. 15-19, 2016).

* cited by examiner

— continued —

SCHEDULING A DATA CHANNEL CORRESPONDING TO A CONTROL CHANNEL

CROSS-REFERENCE TO RELATED APPLICATIONS

This application is a continuation of International Application No. PCT/CN2016/078185, filed on Mar. 31, 2016, the disclosure of which is hereby incorporated by reference in its entirety.

TECHNICAL FIELD

Embodiments of the present invention relate to the communications field, and in particular, to a method, a base station, and user equipment for data transmission.

BACKGROUND

In an existing Long Term Evolution (LTE) system, a downlink control channel includes two types of channels: a physical downlink control channel (PDCCH) and an enhanced physical downlink control channel (EPDCCH). A time-frequency resource occupied by the PDCCH channel is on first to fourth symbols of a transmission time interval (TTI), is determined by using a physical control format indicator channel (PCFICH) channel or higher layer signaling information, and occupies entire system bandwidth. However, a time-frequency resource occupied by the EPDCCH channel is on a symbol occupied by a physical downlink shared channel (PDSCH), and occupies a limited frequency resource.

The 3rd Generation Partnership Project (3GPP) agrees on a research topic Study on Latency Reduction Techniques for LTE at the RP-67 meeting. At the R1-83 meeting, both Huawei and Ericsson propose respective downlink control channel design methods in a short TTI. A solution of Huawei is shown in FIG. 2.

As shown in FIG. 2, the solution of Huawei points out that a short PDCCH (sPDCCH) in a short TTI other than a first short TTI (sTTI) in a subframe has a self-contained feature. To be specific, all resources occupied by the sPDCCH channel are included in sPDSCH resources scheduled by downlink control information (DCI), regardless of whether the sPDCCH resources are centralized or distributed.

A solution of Ericsson points out that a maximum of one user equipment (UE) is scheduled on a frequency band of one short TTI for downlink reception, and a control channel in the short TTI is mapped to a first symbol of the short TTI, and frequency resources are occupied in a distributed manner to obtain a frequency diversity gain.

In consideration that different UEs have different delay requirements in a network, if it is only considered that a time-frequency resource occupied by a control channel is placed on first several symbols of a TTI, and does not occupy entire system bandwidth, it is likely that time-frequency resources of a data channel are irregular, and data channel resource indication overheads are relatively large.

SUMMARY

In view of this, embodiments of the present invention provide a method, a base station, and user equipment for data transmission. A time-frequency resource occupied by a control channel and a time-frequency resource occupied by a data channel corresponding to the control channel are planned, to resolve a problem that overheads of control information configured to indicate a data channel time-frequency resource in a data transmission process are excessively large.

According to a first aspect, a method for data transmission is provided, and the method includes:

determining, by a base station, a current time period in which an end moment of a current control channel is located in a first transmission time interval TTI, where the first TTI includes at least two time periods, and a start moment of a data channel corresponding to a control channel that ends in each of the at least two time periods is located in a different TTI;

sending, by the base station to user equipment in the first TTI, control information carried on the current control channel, where the control information is configured to schedule a current data channel corresponding to the current control channel;

determining, by the base station based on the current time period, a second TTI in which a start moment of the current data channel is located;

exchanging, by the base station, data of the current data channel with the user equipment in the second TTI.

In this way, according to the method in this application, a time-frequency resource in a system is divided regularly, to reduce overheads of control information used by the base station to indicate the time-frequency resource, facilitate resource indication, and improve utilization of the time-frequency resource.

In another embodiment, a length of the current control channel is flexible and variable in time domain.

In another embodiment, the current time period is a time range between a first reference moment and a second reference moment, and the determining, by a base station, a time period in which an end moment of a current control channel is located in a first TTI includes:

determining, by the base station, that the end moment of the current control channel is the second reference moment, or the end moment of the current control channel is within the time range between the first reference moment and the second reference moment.

Optionally, the current data channel includes an uplink data channel or a downlink data channel.

The control information carried on the current control channel can support scheduling of both the uplink data channel and the downlink data channel, or may support scheduling of only the uplink data channel or scheduling of only the downlink data channel.

In another embodiment, if the base station determines that the current time period in which the end moment of the current control channel is located is the $i^{th}$ time period in the at least two time periods, the determining, by the base station based on the current time period, a second TTI in which a start moment of the current data channel is located includes:

determining, by the base station, that the second TTI in which the start moment of the downlink data channel corresponding to the current control channel is located is the $k_i^{th}$ TTI after the first TTI, or the second TTI in which the start moment of the uplink data channel corresponding to the current control channel is located is the $m_i^{th}$ TTI after the first TTI, where $k_i$ and $m_i$ are nonnegative integers, and i is a positive integer.

Different values of i are corresponding to different values of $k_i$ or $m_i$.

For example, it is assumed that the current first TTI is the $n^{th}$ TTI, and three time sub-periods are obtained through division in the first TTI based on a time sequence, for example, a first time period, a second time period, and a third time period.

For scheduling of the downlink data channel, if the end moment of the current control channel is in the first time period, the second TTI in which the start moment of the downlink data channel corresponding to the current control channel is located is the $(n+k1)^{th}$ TTI. If the end moment of the current control channel is in the second time period, the second TTI in which the start moment of the downlink data channel corresponding to the current control channel is located is the $(n+k2)^{th}$ TTI. If the end moment of the current control channel is in the third time period, the second TTI in which the start moment of the downlink data channel corresponding to the current control channel is located is the $(n+k3)^{th}$ TTI.

For scheduling of the uplink data channel, if the end moment of the current control channel is in the first time period, the second TTI in which the start moment of the uplink data channel corresponding to the current control channel is located is the $(n+m1)^{th}$ TTI. If the end moment of the current control channel is in the second time period, the second TTI in which the start moment of the uplink data channel corresponding to the current control channel is located is the $(n+m2)^{th}$ TTI. If the end moment of the current control channel is in the third time period, the second TTI in which the start moment of the uplink data channel corresponding to the current control channel is located is the $(n+m3)^{th}$ TTI.

The k1, k2, k3, m1, m2, and m3 are nonnegative integers and are not equal. For example, k1-0, k2-1, k3-2, m1-3, m2-4, and m3-5. k1=0 indicates that the second TTI is the current first TTI.

In another embodiment, the control information carried on the current control channel includes timing offset indication information, the timing offset indication information indicates that an offset of the second TTI in which the start moment of the downlink data channel is located is Δk or an offset of the second TTI in which the start moment of the uplink data channel is located is Δm, If the base station determines that the current time period in which the end moment of the current control channel is located is the $i^{th}$ time period in the at least two time periods, the determining, by the base station based on the current time period, a second TTI in which a start moment of the current data channel is located includes:

determining, by the base station, that the second TTI in which the start moment of the downlink data channel corresponding to the current control channel is located is the $(k_i+\Delta k)^{th}$ TTI after the first TTI, or the second TTI in which the start moment of the uplink data channel corresponding to the current control channel is located is the $(m_i+\Delta m)^{th}$ TTI after the first TTI, where $k_i$ and $m_i$ are nonnegative integers, i is a positive integer, different values of i are corresponding to different values of $k_i$ or $m_i$, and Δk and Δm are nonnegative integers.

Optionally, if the current control channel is a dedicated control channel configured by the base station for the user equipment, a time-frequency resource corresponding to a time period that is not used in the first TTI or the second TTI may be configured to exchange data of the data channel;

If the current control channel is a common control channel of a plurality of user equipments, a time-frequency resource corresponding to a time period that is not used in the first TTI or the second TTI is not configured to exchange data of the data channel.

Optionally, the control information carried on the current control channel includes at least one of the following: resource indication information, modulation and coding information, power control indication information, process number indication information, or redundancy version information.

In another embodiment, before the determining, by a base station, a current time period in which an end moment of a current control channel is located in a first TTI, the method further includes:

sending, by the base station, control channel indication information to the user equipment, where the control channel indication information is configured to instruct the user equipment to detect the control information on at least one control channel that ends in at least one time period including the current time period.

Optionally, the base station may determine, based on a delay requirement of the user equipment, the current time period in which the end moment of the current control channel is located in the first TTI.

Therefore, the base station indicates that a location at which the user equipment searches for a control information is located on only some specified control channel time-frequency resources, thereby effectively reducing receiving complexity of a system.

According to a second aspect, a method for data transmission is provided, and the method includes:

receiving, by user equipment in a current time period in a first transmission time interval TTI, control information that is carried on a current control channel and that is sent by a base station, where the first TTI includes at least two time periods, a data channel corresponding to a control channel that ends in each of the at least two time periods is located in a different TTI, and the control information is configured to schedule a current data channel corresponding to the current control channel;

determining, by the user equipment based on the current time period, a second TTI in which a start moment of the data channel corresponding to the current control channel is located;

exchanging, by the user equipment, data of the current data channel with the base station in the second TTI based on the control information.

In this way, according to the method in this application, a time-frequency resource in a system is divided regularly, to reduce overheads of control information that is configured to indicate the time-frequency resource and that is received by the user equipment, facilitate resource indication, and improve utilization of the time-frequency resource.

In another embodiment, a length of the current control channel is flexible and variable in time domain.

In another embodiment, the current time period is a time range between a first reference moment and a second reference moment, and the receiving, by user equipment in a current time period in a first TTI, control information that is carried on a current control channel and that is sent by a base station includes:

receiving, by the user equipment at the second reference moment or within the time range between the first reference moment and the second reference moment, the control information sent by the base station.

Optionally, the current data channel includes an uplink data channel or a downlink data channel.

The control information carried on the current control channel can support scheduling of both the uplink data channel and the downlink data channel, or may support scheduling of only the uplink data channel or scheduling of only the downlink data channel.

In another embodiment, if the user equipment receives, in the $i^{th}$ time period in the at least two time periods, the control information that is carried on the current control channel and that is sent by the base station, the determining, by the user equipment based on the current time period, a second TTI in which a start moment of the current data channel corresponding to the current control channel is located includes:

determining, by the user equipment, that the second TTI in which the start moment of the downlink data channel corresponding to the current control channel is located is the $k_i^{th}$ TTI after the first TTI, or the second TTI in which the start moment of the uplink data channel corresponding to the current control channel is located is the $m_i^{th}$ TTI after the first TTI, where $k_i$ and $m_i$ are nonnegative integers, and i is a positive integer.

Optionally, different values of i are corresponding to different values of $k_i$ or $m_i$.

In another embodiment, the control information carried on the current control channel includes timing offset indication information, the timing offset indication information indicates that an offset of the second TTI in which the start moment of the downlink data channel is located is $\Delta k$ or an offset of the second TTI in which the start moment of the uplink data channel is located is $\Delta m$, If the user equipment receives, in the $i^{th}$ time period in the at least two time periods, the control information that is carried on the current control channel and that is sent by the base station, the determining, by the user equipment based on the current time period, a second TTI in which a start moment of the data channel corresponding to the control channel is located includes:

determining, by the user equipment, that the second TTI in which the start moment of the downlink data channel corresponding to the current control channel is located is the $(k_i+\Delta k)^{th}$ TTI after the first TTI, or the second TTI in which the start moment of the uplink data channel corresponding to the current control channel is located is the $(m_i+\Delta m)^{th}$ TTI after the first TTI, where $k_i$ and $m_i$ are nonnegative integers, i is a positive integer, different values of i are corresponding to different values of $k_i$ or $m_i$, and $\Delta k$ and $\Delta m$ are nonnegative integers.

Optionally, if the current control channel is a dedicated control channel configured by the base station for the user equipment, a time-frequency resource corresponding to a time period that is not used in the first TTI or the second TTI is configured to exchange data of the data channel;

If the current control channel is a common control channel of a plurality of user equipments, a time-frequency resource corresponding to a time period that is not used in the first TTI or the second TTI is not configured to exchange data of the data channel.

Optionally, the control information carried on the current control channel includes at least one of the following: resource indication information, modulation and coding information, power control indication information, process number indication information, or redundancy version information.

In another embodiment, the method further includes:
receiving, by the user equipment, control channel indication information sent by the base station;
detecting, by the user equipment based on the control channel indication information, the control information on at least one control channel ending in at least one time period that includes the current time period and that is indicated by the control channel indication information.

Optionally, the control channel indication information may be determined by the base station based on a delay requirement of the user equipment.

Therefore, the user equipment searches for the control information on some specified control channel time-frequency resources based on an indication of the base station, thereby effectively reducing receiving complexity of a system.

According to a third aspect, a base station is provided, and is configured to perform the method in any one of the first aspect or the possible implementations of the first aspect. Specifically, the base station includes:

a determining module, configured to determine a current time period in which an end moment of a current control channel is located in a first transmission time interval TTI, where the first TTI includes at least two time periods, and a start moment of a data channel corresponding to a control channel that ends in each of the at least two time periods is located in a different TTI;

a sending module, configured to send, to user equipment in the first TTI, control information carried on the current control channel, where the control information is configured to schedule a current data channel corresponding to the current control channel;

the determining module is further configured to determine, based on the current time period, a second TTI in which a start moment of the current data channel is located;

the sending module is further configured to send data of the data channel to the user equipment in the second TTI determined by the determining module;

a receiving module, configured to receive, in the second TTI determined by the determining module, data that is of the data channel and that is sent by the user equipment.

According to a fourth aspect, user equipment is provided, and is configured to perform the method in any one of the second aspect or the possible implementations of the second aspect. Specifically, the user equipment includes:

a receiving module, configured to receive, in a current time period in a first transmission time interval TTI, control information that is carried on a current control channel and that is sent by a base station, where the first TTI includes at least two time periods, a data channel corresponding to a control channel that ends in each of the at least two time periods is located in a different TTI, and the control information is configured to schedule a current data channel corresponding to the current control channel;

a determining module, configured to determine, based on the current time period, a second TTI in which a start moment of the current data channel corresponding to the current control channel is located;

a sending module, configured to send data of the data channel to the base station based on the control information in the second TTI determined by the determining module;

the receiving module is further configured to receive, based on the control information in the second TTI determined by the determining module, data that is of the data channel and that is sent by the base station.

According to a fifth aspect, a base station is provided, including a processor, a memory, a bus system, a receiver, and a transmitter. The transmitter and the receiver are respectively configured to send and receive information in a communication process. The memory is configured to store an instruction. The processor is configured to execute the instruction stored in the memory. The instruction stored in the memory is executed, so that the processor performs the method in any one of the first aspect or the possible implementations of the first aspect. Specifically, the processor is specifically configured to:

determine a current time period in which an end moment of a current control channel is located in a first transmission time interval TTI, where the first TTI includes at least two time periods, and a start moment of a data channel corresponding to a control channel that ends in each of the at least two time periods is located in a different TTI;

the transmitter is configured to send, to user equipment in the first TTI, control information carried on the current control channel, the control information is configured to schedule a current data channel corresponding to the current control channel;

the processor is further configured to determine, based on the current time period, a second TTI in which a start moment of the current data channel is located;

the transmitter is further configured to send data of the data channel to the user equipment in the second TTI determined by the processor;

the receiver is configured to receive, in the second TTI determined by the processor, data that is of the data channel and that is sent by the user equipment.

According to a sixth aspect, user equipment is provided, including a processor, a memory, a bus system, a receiver, and a transmitter. The transmitter and the receiver are respectively configured to send and receive information in a communication process. The memory is configured to store an instruction. The processor is configured to execute the instruction stored in the memory. The instruction stored in the memory is executed, so that the processor performs the method in any one of the second aspect or the possible implementations of the second aspect. Specifically, the receiver is specifically configured to: receive, in a current time period in a first transmission time interval TTI, control information that is carried on a current control channel and that is sent by a base station, where the first TTI includes at least two time periods, a data channel corresponding to a control channel that ends in each of the at least two time periods is located in a different TTI, and the control information is configured to schedule a current data channel corresponding to the current control channel;

the processor is configured to determine, based on the current time period, a second TTI in which a start moment of the current data channel corresponding to the current control channel is located;

the transmitter is configured to send data of the data channel to the base station based on the control information in the second TTI determined by the processor;

the receiver is further configured to receive, based on the control information in the second TTI determined by the processor, data that is of the data channel and that is sent by the base station.

According to a seventh aspect, a computer readable medium is provided, and is configured to store a computer program. The computer program includes an instruction configured to perform the method in any one of the first aspect or the possible implementations of the first aspect.

According to an eighth aspect, a computer readable medium is provided, and is configured to store a computer program. The computer program includes an instruction configured to perform the method in any one of the second aspect or the possible implementations of the second aspect.

Based on the foregoing technical solutions, according to the method for data transmission in the embodiments of the present invention, a time-frequency resource in a system is divided regularly, so that there is a fixed correspondence between a time domain resource occupied by a control channel and a time domain resource occupied by a data channel, so as to reduce overheads of control information configured to indicate the data channel, facilitate resource indication, improve utilization of the time-frequency resource, and reduce receiving complexity of the system.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), a Worldwide Interoperability for Microwave Access (WiMAX) communications system, or the like. In the embodiments of the present invention, an LTE communications system is used as an example for description.

It should be further understood that in the embodiments of the present invention, user equipment (UE) may be referred to as a terminal, a mobile station (MS), a mobile terminal, or the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a base station may be a base transceiver station (BTS) in GSM or CDMA, or may be a NodeB (NB) in WCDMA, or may be an evolved NodeB (Evolutional NodeB, eNB or eNodeB for short) in LTE, which is not limited in the present invention. However, for ease of description, the following embodiments are described by using an eNodeB as an example.

Figure 1:
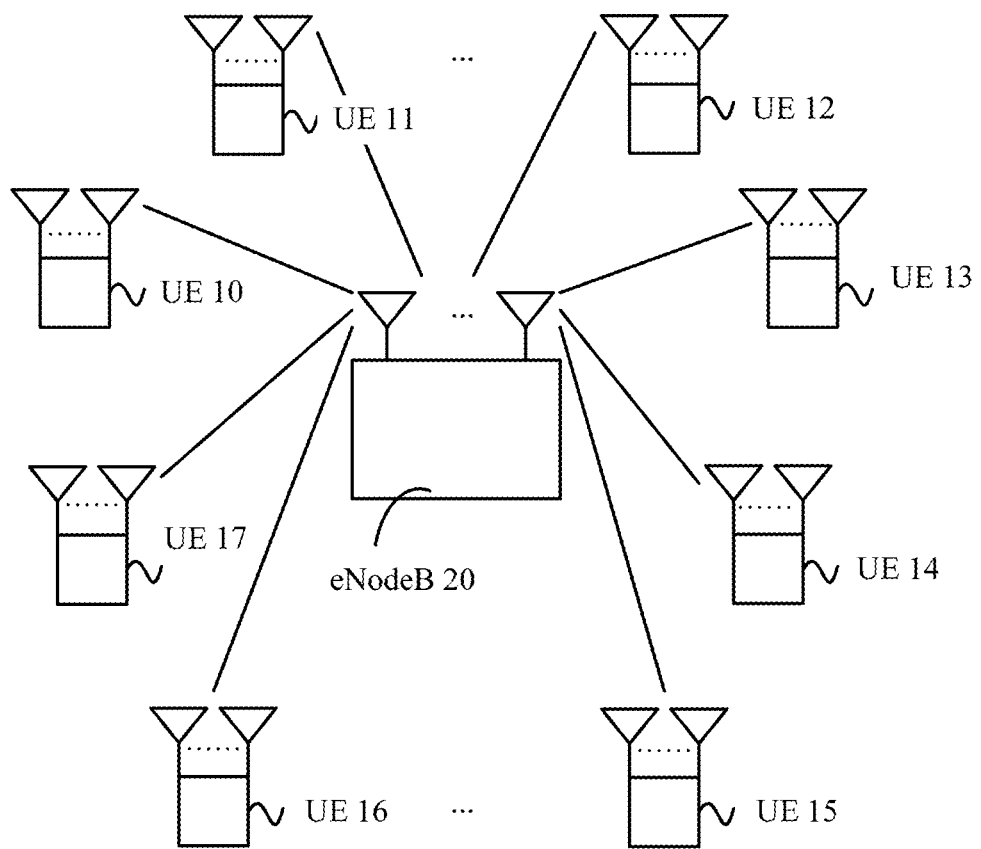
FIG. 1 is a schematic architectural diagram of an application scenario according to an embodiment of the present invention.
Figure 2:
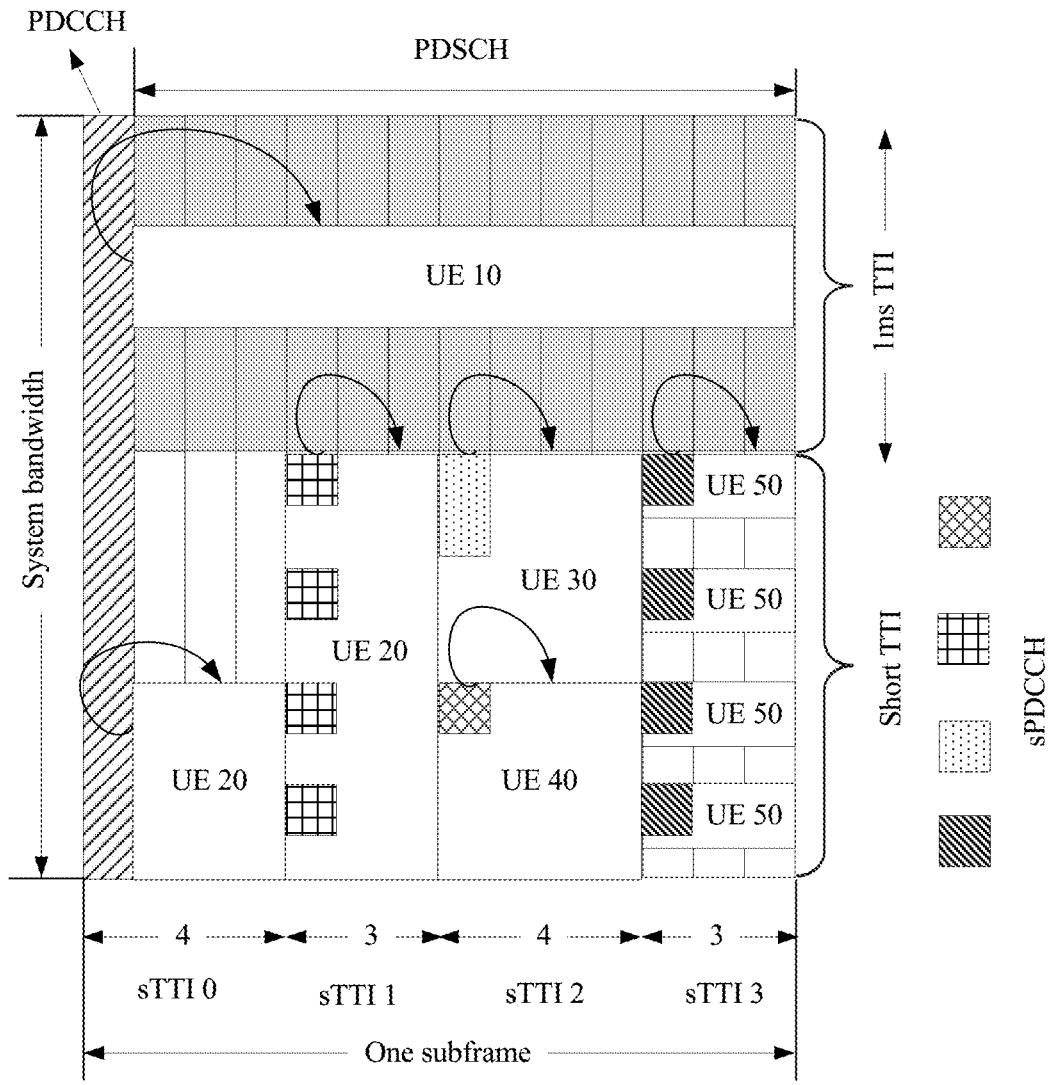
FIG. 2 is a schematic diagram of multiplexing of a control channel time-frequency resource and a data channel time-frequency resource in a short TTI in the prior art.

FIG. 1 is a schematic architectural diagram of an application scenario according to an embodiment of the present invention. As shown in FIG. 1, a basic network architecture of an LTE communications system may include a base station 20 and at least one wireless terminal, such as UE 10, UE 11, UE 12, UE 13, UE 14, UE 15, UE 16, and UE 17. As shown in FIG. 1, an eNodeB 20 is configured to: provide a communication service for the at least one wireless terminal of the UE 10 to the UE 17, and access to a core network. The eNodeB 20 and any wireless terminal of the UE 10 to the UE 17 may include at least one antenna. FIG. 1 shows a case in which there are a plurality of antennas. Communication between the UE 10 and the eNodeB 20 is used as an example for description herein.

In this application scenario, when control information and data are transferred between the UE 10 and the eNodeB 20, frequency division multiplexing (FDM) may be performed on a time-frequency resource occupied by a control channel and a time-frequency resource occupied by a data channel. For brevity, the time-frequency resource occupied by the control channel is referred to as a control channel time-frequency resource, and the time-frequency resource occupied by the data channel is referred to as a data channel time-frequency resource herein.

Figure 3:
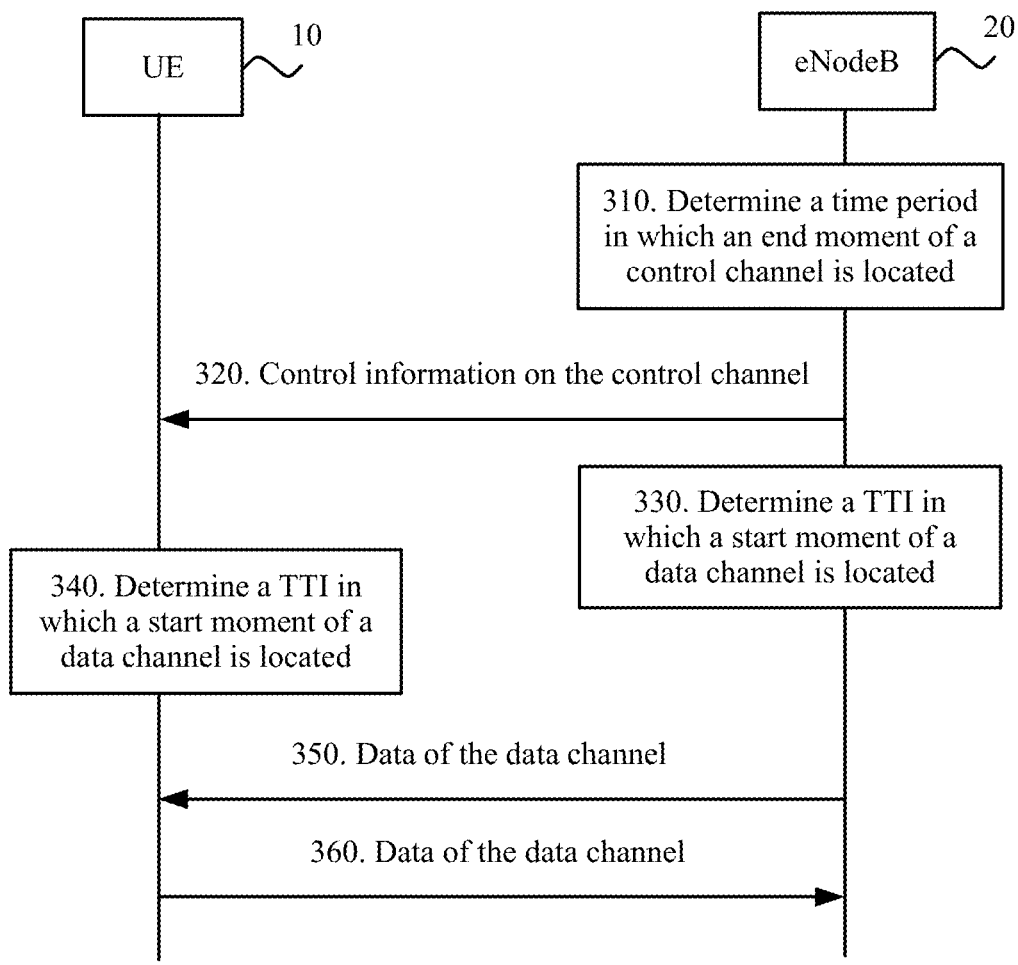
FIG. 3 is an interactive flowchart of a method for data transmission according to an embodiment of the present invention.

FIG. 3 is an interactive flowchart of a method for data transmission according to an embodiment of the present invention. FIG. 3 shows UE 10 and an eNodeB 20. As shown in FIG. 3, a procedure of the data transmission specifically includes the following steps.

310. The eNodeB 20 determines a time period in which an end moment of a control channel is located in a first TTI.

Specifically, the eNodeB 20 determines a current time period in which an end moment of a current control channel is located in a first TTI. The first TTI includes at least two time periods, and a start moment of a data channel corresponding to a control channel that ends in each of the at least two time periods is located in a different TTI. The eNodeB 20 divides a time domain resource in the first TTI based on a time sequence, so that the first TTI includes at least two time periods, so that control information carried on different control channels is sent in different time periods in the first TTI. The eNodeB 20 may determine, based on information such as a delay requirement of the UE 10, a time period in which a control channel configured to schedule the UE 10 is sent in the first TTI, and determine, based on a timing relationship between a time period occupied by a control channel and a second TTI used by a data channel, a second TTI that needs to be used when a data channel corresponding to the control channel is transmitted. A different time period for sending a control channel in the first TTI results in a different second TTI that is occupied by a data channel scheduled by the control channel.

The data channel and the control channel each occupy a period of time in time domain, starting from a start moment to an end moment. It should be understood that in this embodiment, the time period may also be referred to as a control channel time domain sub-resource, and is corresponding to a specified frequency band resource. The time domain resource and the frequency band resource jointly form a time-frequency resource. To be specific, the eNodeB 20 may obtain at least two control channel time-frequency sub-resources through division in the first TTI based on the time sequence. The at least two control channel time-frequency sub-resources have same frequency domain resources and different time domain resources. For control channels that occupy different control channel time-frequency sub-resources, data channels scheduled by control information carried on the control channels occupy different TTIs. Each control channel time-frequency sub-resource is corresponding to one data channel time-frequency resource. If the eNodeB 20 determines a control channel time-frequency sub-resource occupied by the current control channel, the eNodeB 20 can determine a time-frequency resource occupied by a data channel scheduled by control information carried on the current control channel, namely, a second TTI that needs to be used at a start moment at which the data channel is transmitted.

It should be further understood that the time period occupied by the control channel herein is a time period in which an end moment of the control channel is located. Determining the time period occupied by the control channel is to determine the time period in which the end moment of the control channel is located. A reason is that the control channel may be sent in one time period in the TTI, or may be sent in several consecutive time periods. To be specific, control channels that end in each time period may have different lengths.

It should be further understood that the second TTI occupied by the data channel herein is a TTI in which a start moment of the data channel is located. Determining the second TTI occupied by the data channel is to determine the second TTI in which the start moment of the data channel is located. Because data channels corresponding to different control channels have different lengths, the data channels may be sent or received in one TTI, or may be specified to be sent or received in several consecutive TTIs.

In another embodiment, the time period is a time range between a first reference moment and a second reference moment, and that the eNodeB 20 determines the current time period in which the end moment of the current control channel is located in the first TTI includes:

The eNodeB 20 determines that the end moment of the current control channel is the second reference moment, or the end moment of the current control channel falls within the time range between the first reference moment and the second reference moment.

Specifically, when the end moment of the current control channel in the first TTI falls within the time interval ranging from the first reference moment to the second reference moment, it is considered that the end moment of the control channel is located in the current time period. For example, an end moment of a sending time of the control channel is set to t, a start moment of the first TTI is set to T0, the first reference moment of the time period is set to T1, and the second reference moment is set to T2. If t falls between T1 and T2, in other words, T1<t≤T2, it is considered that the end moment of the control channel is located in the time period. Therefore, the data channel scheduled by the control channel may be transmitted in a second TTI that is corresponding to the time period (to be specific, the moment T1) and that is configured to transmit data of the data channel. It should be understood that alternatively, when T1≤t<T2 is met, it is considered that the end moment of the current control channel is located in the current time period. This is not limited in the present invention.

320. The eNodeB 20 sends, to the UE 10, control information carried on the current control channel.

Specifically, after determining a time period in which an end moment of a current control channel configured to schedule the UE 10 is located in the first TTI, the eNodeB 20 may send the control channel to the UE 10 in the time period or a time period before the time period.

Optionally, the control information carried on the current control channel includes at least one of the following: resource indication information, modulation and coding information, power control indication information, process number indication information, or redundancy version information.

It should be understood that sending of the current control channel may occupy only one time period, or may occupy a plurality of time periods. The eNodeB 20 determines, based on the time period in which the end moment of the current control channel is located, the second TTI occupied by the data channel corresponding to the current control channel.

330. The eNodeB 20 determines a second TTI in which a start moment of a current data channel corresponding to the current control channel.

It should be noted that a control channel ending in a time period means that an end moment of the control channel in time domain is located in the time period. In addition, in the embodiment, a length of the control channel is not fixed, namely, is flexible in time domain. For example, compared with the prior art in which the control channel permanently occupies several OFDM (orthogonal frequency division multiplexing) symbols, the control channel in the embodiment has a length that may change in time domain, and may be located in any time period in the first TTI. Based on a correspondence between different time periods or different control channels and different data channels whose start moments are located in different TTIs, when the control channel falls within a specific time period, the eNodeB 20 or the UE 10 may determine which TTI is the second TTI in which the start moment of the current data channel corresponding to the current control channel is located.

Specifically, the eNodeB 20 determines, based on the current time period in which the end moment of the current control channel is located in the first TTI, the second TTI in which the start moment of the current data channel corresponding to the current control channel is located. There is a correspondence between a time period occupied by a current control channel in a first TTI and a second TTI in which a start moment of a current data channel corresponding to the current control channel is located. Data channels corresponding to control channels that end in different time periods have different time sequences. Because the time period in which the control channel is sent and the second TTI used when the data channel corresponding to the control channel is transmitted are planned by the eNodeB 20, the second TTI in which the start moment of the data channel is located in a transmission process can be determined provided that the time period in which the end moment of sending the control channel is located is determined. Therefore, when the data channel is received or sent, only a frequency domain resource occupied by the data channel needs to be indicated, thereby saving control signaling that is configured to indicate a time domain resource occupied by the data channel.

Optionally, the data channel includes an uplink (UL) data channel or a downlink (DL) data channel. To be specific, the control information carried on the control channel can support scheduling of both the uplink data channel and the downlink data channel, or may support scheduling of only the uplink data channel or scheduling of only the downlink data channel.

In another embodiment, if the eNodeB 20 determines that the current time period in which the end moment of the current control channel is located is the $i^{th}$ time period in the at least two time periods, the eNodeB 20 determines a second TTI in which a start moment of a current data channel corresponding to the current control channel is located includes: determining, by the eNodeB 20, that the second TTI in which the start moment of the downlink data channel corresponding to the current control channel is located is the $k_i^{th}$ TTI after the first TTI, or that the second TTI in which the start moment of the uplink data channel corresponding to the current control channel is located is the $m_i^{th}$ TTI after the first TTI. where $k_i$ and $m_i$ are nonnegative integers, and i is a positive integer.

Specifically, if the eNodeB 20 determines that the time period in which the end moment of the current control channel is located is the $i^{th}$ time period in the at least two time periods, the eNodeB 20 determines, based on a correspondence between a time period in which an end moment of a current control channel is located and a second TTI in which a start moment of a current data channel corresponding to the current control channel is located, a second TTI in which a start moment of a data channel corresponding to the $i^{th}$ time period is located. If the current control channel is a downlink data channel, the second TTI is the $k_i^{th}$ TTI after the first TTI; and if the current control channel is an uplink data channel, the second TTI is the $m_i^{th}$ TTI after the first TTI.

It should be understood that if $k_i=0$ or $m_i=0$, the second TTI is the first TTI in which the end moment of the current control channel is located. To be specific, the uplink data channel or the downlink data channel starts to be transmitted in the current first TTI. For brevity, details are not described again in the following.

In other words, it is assumed that the first TTI is the $n^{th}$ TTI. The eNodeB 20 determines, based on the $i^{th}$ time period, that the second TTI in which the start moment of the downlink data channel corresponding to the current control channel is located is the $(n+k_i)^{th}$ TTI, or that the second TTI in which the start moment of the uplink data channel corresponding to the current control channel is located is the $(n+m_i)^{th}$ TTI.

Figure 4:
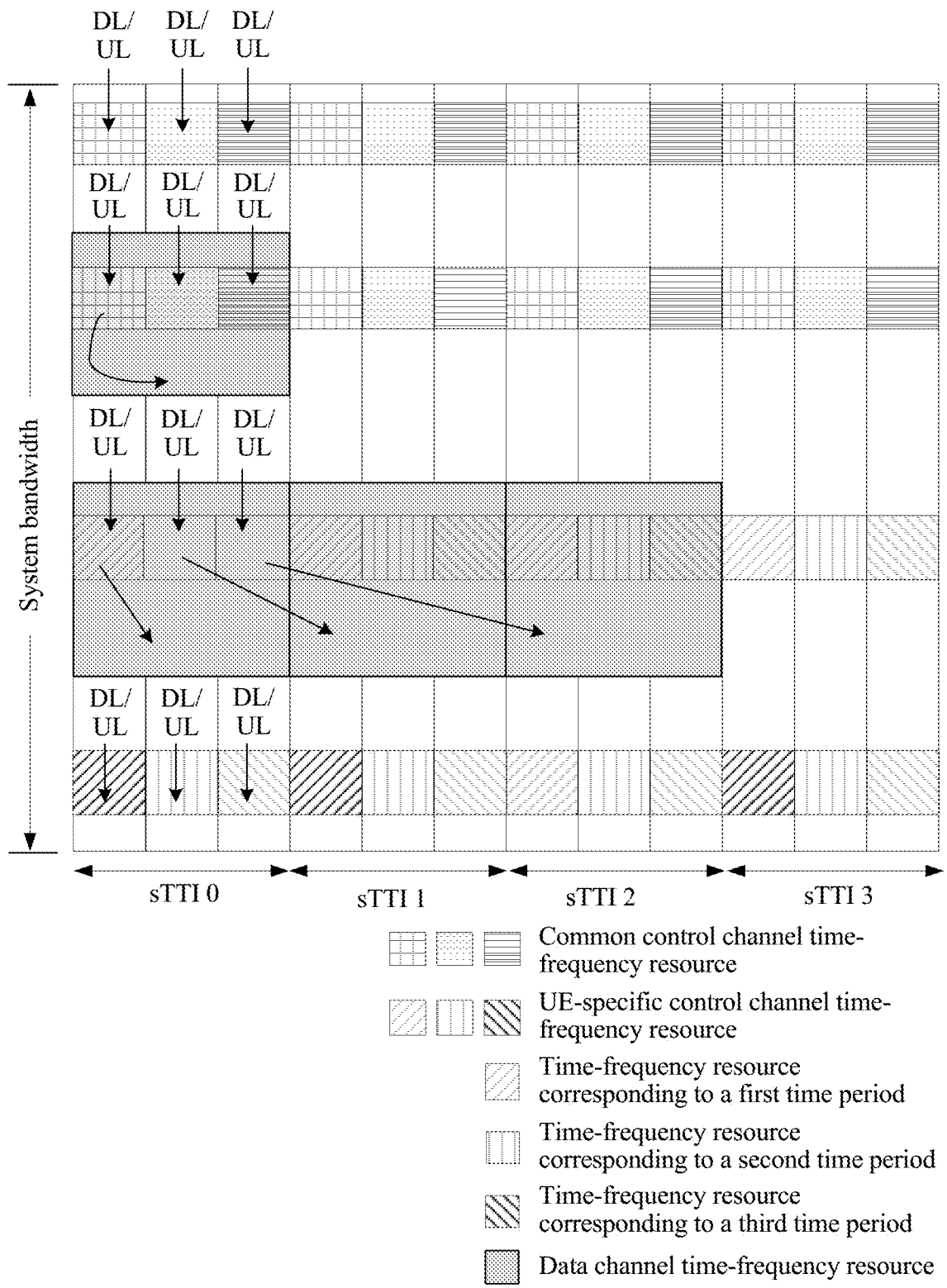
FIG. 4 is a schematic diagram of planning a control channel time-frequency resource and a data channel time-frequency resource according to an embodiment of the present invention.
Figure 5:
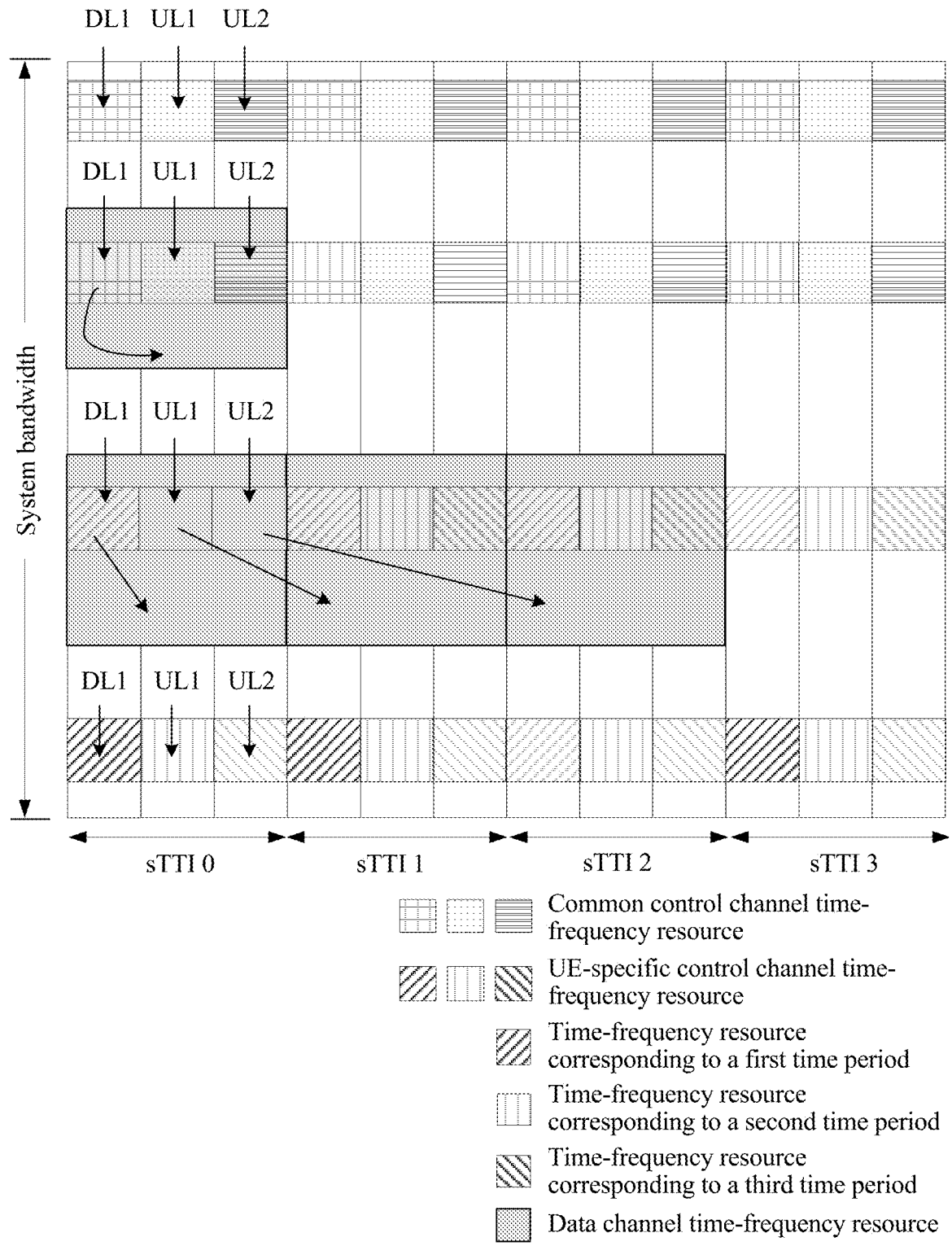
FIG. 5 is a schematic diagram of planning a control channel time-frequency resource and a data channel time-frequency resource according to another embodiment of the present invention.
Figure 6:
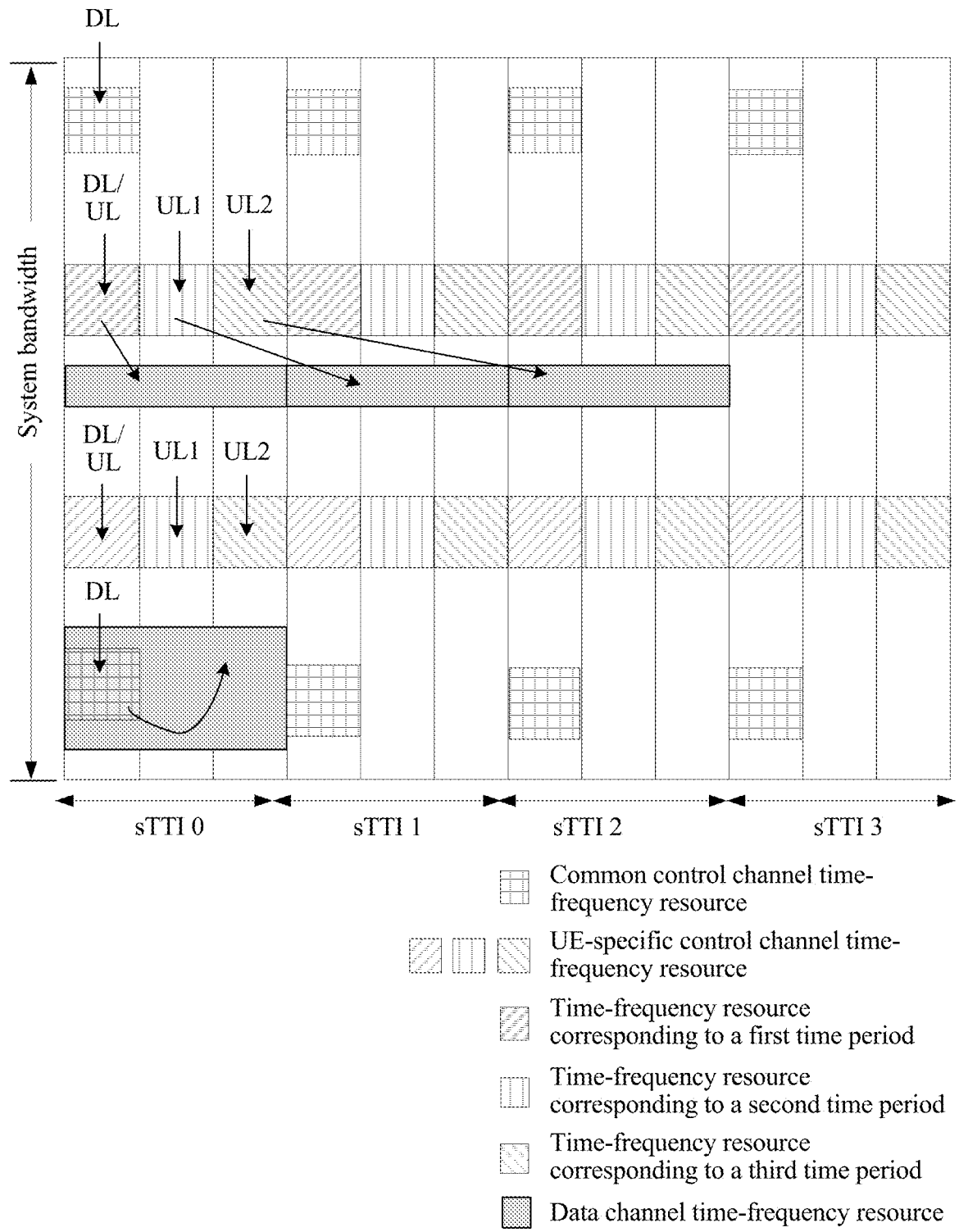
FIG. 6 is a schematic diagram of planning a control channel time-frequency resource and a data channel time-frequency resource according to another embodiment of the present invention.

With reference to FIG. 4 to FIG. 6, the following specifically describes a method for determining, by the eNodeB 20 based on the current time period in which the end moment of the current control channel is located, the second TTI in which the start moment of the current data channel corresponding to the current control channel is located.

FIG. 4 is a schematic diagram of planning a control channel time-frequency resource and a data channel time-frequency resource according to an embodiment of the present invention. As shown in FIG. 4, a time-frequency resource indicated by an arrow indicates a time-frequency resource occupied by a data channel corresponding to a control channel sent in a time period. Control information carried on a control channel that ends in each of the at least two time periods obtained through division in the first TTI can support scheduling of both the downlink data channel and the uplink data channel.

For example, it is assumed that the current first TTI is the $n^{th}$ TTI, and three time sub-periods are obtained through division in the first TTI based on the time sequence, for example, a first time period, a second time period, and a third time period. For control information carried on control channels that end in the first time period, the second time period, and the third time period, a second TTI occupied by a start moment of a data channel scheduled by the control information is the first TTI or any TTI after the first TTI.

For scheduling of the downlink data channel, if the end moment of the current control channel is located in the first time period, the second TTI in which the start moment of the downlink data channel corresponding to the current control channel is located is the $(n+k1)^{th}$ TTI, to be specific, the eNodeB 20 sends the downlink data channel in the $(k1)^{th}$ TTI after the first TTI. If the end moment of the current control channel is located in the second time period, the second TTI in which the start moment of the downlink data channel corresponding to the current control channel is located is the $(n+k2)^{th}$ TTI, to be specific, the eNodeB 20 sends the downlink data channel in the $(k2)^{th}$ TTI after the first TTI. If the end moment of the current control channel is located in the third time period, the second TTI in which the start moment of the downlink data channel corresponding to the current control channel is located is the $(n+k3)^{th}$ TTI, to be specific, the eNodeB 20 sends the downlink data channel in a $(k3)^{th}$ TTI after the first TTI.

For scheduling of the uplink data channel, if the end moment of the current control channel is located in the first time period, the second TTI in which the start moment of the uplink data channel corresponding to the current control channel is located is the $(n+m1)^{th}$ TTI, to be specific, the eNodeB 20 starts to receive the uplink data channel in the $(m1)^{th}$ TTI after the first TTI. If the end moment of the current control channel is located in the second time period, the second TTI in which the start moment of the uplink data channel corresponding to the current control channel is located is the $(n+m2)^{th}$ TTI, to be specific, the eNodeB 20 receives the uplink data channel in the $(m2)^{th}$ TTI after the first TTI. If the end moment of the current control channel is located in the third time period, the second TTI in which the start moment of the uplink data channel corresponding to the current control channel is located is the $(n+m3)^{th}$ TTI, to be specific, the eNodeB 20 receives the uplink data channel in the $(m3)^{th}$ TTI after the first TTI.

The k1, k2, k3, m1, m2, and m3 are nonnegative integers and are not equal. For example, k1-0, k2-1, k3-2, m1-3, m2-4, and m3-5. It should be noted that when k1=0, it means that the second TTI is the zeroth TTI after the first TTI. That the second TTI is the zeroth TTI after the first TTI means that the two TTIs are the same TTI.

FIG. 5 is a schematic diagram of planning a control channel time-frequency resource and a data channel time-frequency resource according to another embodiment of the present invention. As shown in FIG. 5, a time-frequency resource indicated by an arrow indicates a time-frequency resource occupied by a data channel corresponding to a control channel sent in a time period. In the at least two time periods obtained through division in the first TTI, control information carried on a control channel that ends in each of some time periods supports scheduling of the uplink data channel, but control information carried on a control channel that ends in each of the other time periods is configured to schedule the downlink data channel.

For example, it is assumed that the current first TTI is the $n^{th}$ TTI, and three time sub-periods are obtained through division in the first TTI based on the time sequence, namely, a first time period, a second time period, and a third time period. Control information carried on a control channel that ends in the first time period is configured to schedule the downlink data channel, and control information carried on control channels that end in the second time period and the third time period is configured to schedule the uplink data channel.

If the end moment of the control channel is located in the first time period, the second TTI in which the start moment of the downlink data channel corresponding to the control channel is located is the $(n+k1)^{th}$ TTI. If the end moment of the control channel is located in the second time period, the second TTI in which the start moment of the uplink data channel corresponding to the control channel is located is the $(n+m1)^{th}$ TTI. If the end moment of the control channel is located in the third time period, the second TTI in which the start moment of the uplink data channel corresponding to the control channel is located is the $(n+m2)^{th}$ TTI.

The k1, m1, and m2 are natural numbers and are not equal. For example, k1=0, m1=1, and m2=2.

FIG. 6 is a schematic diagram of planning a control channel time-frequency resource and a data channel time-frequency resource according to another embodiment of the present invention. As shown in FIG. 6, a time-frequency resource indicated by an arrow indicates a time-frequency resource occupied by a data channel corresponding to a control channel sent in a time period. In the at least two time periods obtained through division in the first TTI, control information carried on a control channel that ends in each of some time periods can support scheduling of both the uplink data channel and the downlink data channel, but control information carried on a control channel that ends in each of the other time periods supports scheduling of only the uplink data channel or scheduling of only the downlink data channel.

For example, it is assumed that the current first TTI is the $n^{th}$ TTI, and three time sub-periods are obtained through division in the first TTI based on the time sequence, for example, a first time period, a second time period, and a third time period. Control information carried on a control channel that ends in the first time period can support scheduling of the downlink data channel and the uplink data channel, and control information carried on control channels that end in the second time period and the third time period is configured to schedule only the uplink data channel.

If the end moment of the current control channel is located in the first time period, the second TTI in which the start moment of the downlink data channel scheduled by the current control channel is located is the $(n+k1)^{th}$ TTI, to be specific, the eNodeB 20 sends the downlink data channel in the $(k1)^{th}$ TTI after the first TTI; and, the second TTI in which the start moment of the uplink data channel corresponding to the control channel that ends in the first time period is located is the $(n+m1)^{th}$ TTI, to be specific, the eNodeB 20 receives the uplink data channel in the $(m1)^{th}$ TTI after the first TTI. If the end moment of the current control channel is located in the second time period, the second TTI in which the start moment of the uplink data channel scheduled by the current control channel is located is the $(n+m2)^{th}$ TTI, to be specific, the eNodeB 20 receives the uplink data channel in the $(m2)^{th}$ TTI after the first TTI. If the end moment of the current control channel is located in the third time period, the second TTI in which the start moment of the uplink data channel scheduled by the current control channel is located is the $(n+m3)^{th}$ TTI, to be specific, the eNodeB 20 receives the uplink data channel in the $(m3)^{th}$ TTI after the first TTI.

The k1, k2, k3, m1, m2 and m3 are natural numbers and are not equal. For example, k1=0, m1=1, m2=2, and m3=3.

It should be understood that for a control channel sent in the $(n+1)^{th}$ TTI, a TTI occupied by a data channel may be planned with reference to the above described method for data transmission performed in the $n^{th}$ TTI. For brevity, details are not described herein again.

It should be further understood that when the control information carried on the current control channel sent in the first TTI supports both scheduling of the uplink data channel and scheduling of the downlink data channel, the eNodeB 20 may first schedule the downlink data channel, and then schedule the uplink data channel, or may first schedule the uplink data channel, and then schedule the downlink data channel. This is not limited in the present invention. It only needs to maintain a planned correspondence between a time period in which an end moment of a control channel is located and TTIs occupied by an uplink data channel and a downlink data channel that are scheduled by control information carried on the control channel.

In another embodiment, if the control information carried on the current control channel further includes timing offset indication information, and the timing offset indication information indicates that an offset of a second TTI occupied by the downlink data channel is Δk or an offset of a second TTI occupied by the uplink data channel is Δm, that the eNodeB 20 determines, based on the current time period in which the end moment of the current control channel is located, the second TTI in which the start moment of the current data channel corresponding to the current control channel is located includes:

determining, by the eNodeB 20, that the second TTI occupied by the downlink data channel corresponding to the current control channel is the $(k_i+\Delta k)^{th}$ TTI after the first TTI, or the second TTI occupied by the uplink data channel corresponding to the current control channel is the $(m_i+\Delta m)^{th}$ TTI after the first TTI, where Δk and Δm are nonnegative integers.

Specifically, if downlink control information carried on the control channel includes timing offset indication information, the eNodeB 20 determines, based on the current time period in which the end moment of the current control channel is located and the timing offset indication information in the downlink control information carried on the current control channel, the second TTI in which the start moment of the current data channel corresponding to the current control channel is located. The timing offset indication information is configured to indicate the offset of the second TTI occupied by the start moment of the current data channel, for example, Δk and Δm.

For example, assuming that the timing offset indication information indicates that the offset of the second TTI occupied by the start moment of the current data channel is Δk, control information carried on a control channel that ends in the $i^{th}$ time period in the $n^{th}$ TTI is configured to schedule sending of the downlink data channel in the $(n+k_i+\Delta k)^{th}$ TTI, or schedule sending of the uplink data channel in the $(n+m_i+\Delta m)^{th}$ TTI.

340. The UE 10 determines a second TTI in which a start moment of a data channel is located.

Specifically, the eNodeB 20 determines a correspondence between a time period occupied by a control channel and a second TTI used when a data channel starts, and notifies the UE 10 of the correspondence (namely, a timing relationship). The UE 10 receives, in the current time period in which the end moment of the current control channel is located, current control information sent by the eNodeB 20, and determines the second TTI in which the start moment of the current data channel corresponding to the current control channel is located.

It should be understood that for a method in which the UE 10 determines the second TTI occupied by the current data channel, refer to the description of the method in which the eNodeB 20 determines the second TTI occupied by the data channel in step 330. For brevity, details are not described herein again.

After determining the second TTI occupied to communicate the data channel, data exchange may be performed between the UE 10 and the eNodeB 20. To be specific, step 350 or 360 is performed.

350. The eNodeB 20 sends data of the data channel to the UE 10 in the second TTI. The UE 10 may specifically receive the data from the eNodeB 20 based on the control information, to be specific, receive the data by scheduling the control information.

360. The UE 10 sends data of the data channel to the eNodeB 20 in the second TTI. The UE 10 may specifically send the data to the eNodeB 20 based on the control information, to be specific, send the data by scheduling of the control information.

After determining the second TTI occupied by the current data channel corresponding to the current control channel, the eNodeB 20 and the UE 10 may start to exchange data of the data channel in the second TTI occupied by the start moment of the current data channel. Exchanging the data may include sending and receiving the data.

In another embodiment, if the current control channel is a dedicated control channel configured by the eNodeB 20 for the UE 10, a time-frequency resource corresponding to a time period that is not used in the first TTI or the second TTI may be configured to exchange the data of the data channel.

Specifically, if the current control channel is a dedicated control channel configured by the eNodeB 20 for the UE 10, to be specific, the UE 10 is specific user equipment (UE-specific), a time-frequency resource corresponding to a time period that is not used in the first TTI can be configured to exchange the data of the data channel; or if the control channel is a common control channel of a plurality of user equipments, a time-frequency resource corresponding to a time period that is not used in the first TTI is not used by the data channel. A reason is that a time-frequency location in a time-frequency resource region of the common control channel can be learned by all user equipments. However, a time-frequency resource region of a UE-specific control channel is separately configured by the eNodeB 20 for the UE-specific, and a time-frequency location of the time-frequency resource region of the UE-specific control channel can be learned only by the UE-specific.

In this embodiment of the present invention, the time-frequency resource region of the common control channel and the time-frequency resource region of the UE-specific control channel are distinguished. A time-frequency resource in the time-frequency resource region of the common control channel cannot be configured to transmit the data channel, and a time-frequency resource that is not used in the time-frequency resource region of the UE-specific control channel may be configured to transmit the data channel.

Optionally, if the first TTI includes only one time sub-period, the eNodeB 20 specifies that control information carried on a control channel that ends in the time period is configured to schedule only the uplink data channel or only the downlink data channel.

For example, in a time period occupied by a common control channel shown in a first row in FIG. 6, because the TTI includes only one time period, it is considered by default that control information carried on a control channel that ends in the time period is configured to schedule only the downlink data channel or the uplink data channel.

Figure 7:
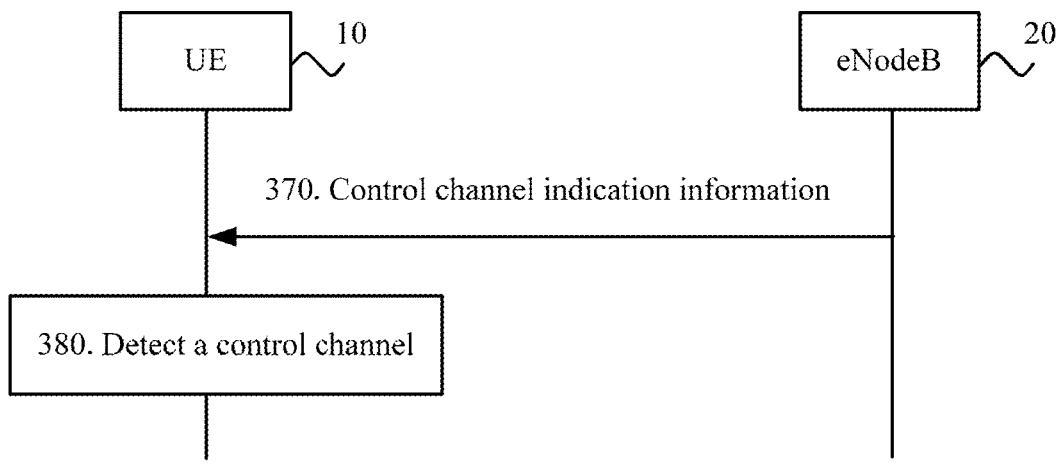
FIG. 7 is an interactive flowchart of control information detection according to an embodiment of the present invention.

In another embodiment, the eNodeB 20 may determine, based on the delay requirement of the UE 10, the current time period in which the end moment of the current control channel is located in the first TTI. The method for data transmission may further include steps 370 and 380 shown in FIG. 7. FIG. 7 is an interactive flowchart of control channel detection according to an embodiment of the present invention.

370. The eNodeB 20 sends control channel indication information to the UE 10.

The control channel indication message is configured to instruct the UE 10 to detect the control information on at least one control channel that ends in at least one time period including the current time period in which the end moment of the control channel is located.

Specifically, it is assumed that the UE 10 has a relatively high delay requirement, and requires a relatively short delay. For example, in a time period obtained through division in the first TTI based on the time sequence, a TTI occupied by a data channel corresponding to a control channel that is sent in an earlier time period is earlier, and a delay in sending or receiving the data channel corresponding to the control channel is relatively short. Therefore, the eNodeB 20 may instruct the UE 10 to detect control information of the UE 10 in an earlier time period in the at least two time periods, for example, instruct the UE 10 to detect the control information of the UE 10 in a first time period, and schedule, based on the control information, a data channel in the $(k1)^{th}$ TTI after the first TTI, so as to exchange the data of the data channel with the eNodeB 20 in the $(k1)^{th}$ TTI after the first TTI based on the control information. For example, when k1=0, the second TTI in which the data channel is transmitted is the current first TTI, and a shortest delay is ensured.

380. The UE 10 detects the control channel in a time period indicated by the control channel indication information.

Specifically, the UE 10 detects, based on the control channel indication information, the control information on at least one control channel ending in at least one time period that includes the current time period and that is indicated by the control channel indication information. The current time period may be determined by the eNodeB 20 based on the delay requirement of the UE 10.

It should be understood that in steps 370 and 380, if the eNodeB 20 schedules the UE 10 by using a plurality of control channels, the UE 10 detects the control channels in the at least one time period. Each of the control channels may be corresponding to one of the at least one time period. The UE 10 may search for control information on the control channels in the at least one time period based on the control channel indication information sent by the eNodeB 20.

Because the eNodeB 20 specifies that a location at which the UE 10 searches for a control information is located on only some specified control channel time-frequency resources, receiving complexity of a system is effectively reduced.

In this way, according to the method for data transmission in this embodiment of the present invention, a time-frequency resource in the system is divided regularly, to reduce overheads of control information configured to indicate the time-frequency resource, facilitate resource indication, improve utilization of the time-frequency resource, and reduce receiving complexity of the system.

It should be understood that sequence numbers of the foregoing processes do not mean execution sequences. The execution sequences of the processes should be determined based on functions and internal logic of the processes, and should not be construed as any limitation on the implementation processes of the embodiments of the present invention.

The method for data transmission according to the embodiments of the present invention is described above in detail with reference to FIG. 3 to FIG. 7. A base station 20 and user equipment 10 according to the embodiments of the present invention are described in detail below with reference to FIG. 8 to FIG. 11.

Figure 8:
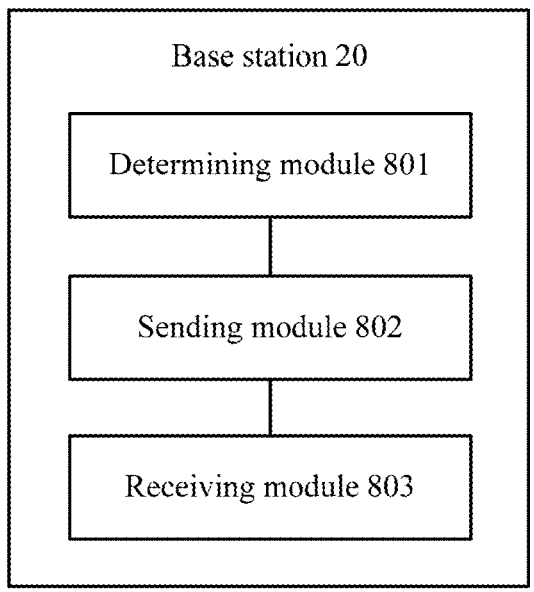
FIG. 8 is a schematic block diagram of a base station for data transmission according to an embodiment of the present invention.

FIG. 8 is a structural block diagram of a base station 20 according to an embodiment of the present invention. The base station 20 shown in FIG. 8 can be configured to execute processes implemented by the base station 20 in the method embodiment in FIG. 3. As shown in FIG. 8, the base station 20 includes a determining module 801, a sending module 802, a receiving module 803.

The determining module 801 is configured to determine a current time period in which an end moment of a current control channel is located in a first transmission time interval TTI. The first TTI includes at least two time periods, and a start moment of a data channel corresponding to a control channel that ends in each of the at least two time periods is located in a different TTI;

the sending module 802 is configured to send, to user equipment in the first TTI, control information carried on the current control channel, the control information is configured to schedule a current data channel corresponding to the current control channel;

the determining module 801 is configured to determine, based on the current time period, a second TTI in which a start moment of the current data channel is located;

the sending module 802 is further configured to send data of the current data channel to the UE 10 in the second TTI determined by the determining module.

The receiving module 803 is configured to receive, in the second TTI determined by the determining module, data that is of the current data channel and that is sent by the UE 10.

In this way, according to the method for data transmission in the embodiments of the present invention, a time-frequency resource in a system is divided regularly, to reduce overheads of control information used by the base station 20 to indicate the time-frequency resource, facilitate resource indication, and improve utilization of the time-frequency resource.

Optionally, in another embodiment, a length of the current control channel is flexible and variable in time domain.

In another embodiment, the current time period is a time range between a first reference moment and a second reference moment, and the determining module is specifically configured to:

determine that the end moment of the current control channel is the second reference moment, or the end moment of the current control channel falls within the time range between the first reference moment and the second reference moment.

Optionally, in another embodiment, the current data channel includes an uplink data channel or a downlink data channel.

Optionally, in another embodiment, if the determining module 801 determines that the current time period in which the end moment of the current control channel is located is the $i^{th}$ time period in the at least two time periods, the determining module 801 is further configured to:

determine that the second TTI in which the start moment of the downlink data channel corresponding to the current control channel is located is the $k_i^{th}$ TTI after the first TTI, or the second TTI in which a start moment of an uplink data channel corresponding to the current control channel is located is the $m_i^{th}$ TTI after the first TTI, where $k_i$ and $m_i$ are nonnegative integers, i is a positive integer, and different values of i are corresponding to different values of $k_i$ or $m_i$.

Optionally, in another embodiment, the control information carried on the current control channel includes timing offset indication information, and the timing offset indication information indicates that an offset of a second TTI in which a start moment of the downlink data channel is located is Δk or an offset of a second TTI in which a start moment of the uplink data channel is located is Δm, if the determining module determines that the current time period in which the end moment of the current control channel is located is the $i^{th}$ time period in the at least two time periods, the determining module 801 is further configured to:

determine that the second TTI in which the start moment of the downlink data channel corresponding to the current control channel is located is the $(k_i+\Delta k)^{th}$ TTI after the first TTI, or the second TTI in which the start moment of the uplink data channel corresponding to the current control channel is located is the $(m_i+\Delta m)^{th}$ TTI after the first TTI, where $k_i$ and $m_i$ are nonnegative integers, i is a positive integer, different values of i are corresponding to different values of $k_i$ or $m_i$, and Δk and Δm are nonnegative integers.

Optionally, in another embodiment, the sending module 802 is further configured to:

send control channel indication information to the UE 10, where the control channel indication message is configured to instruct the UE 10 to detect the control information on at least one control channel that ends in at least one time period including the current time period.

Therefore, it is indicated that a location at which the UE 10 searches for a control information is located on only some specified control channel time-frequency resources, thereby effectively reducing receiving complexity of the system.

Figure 9:
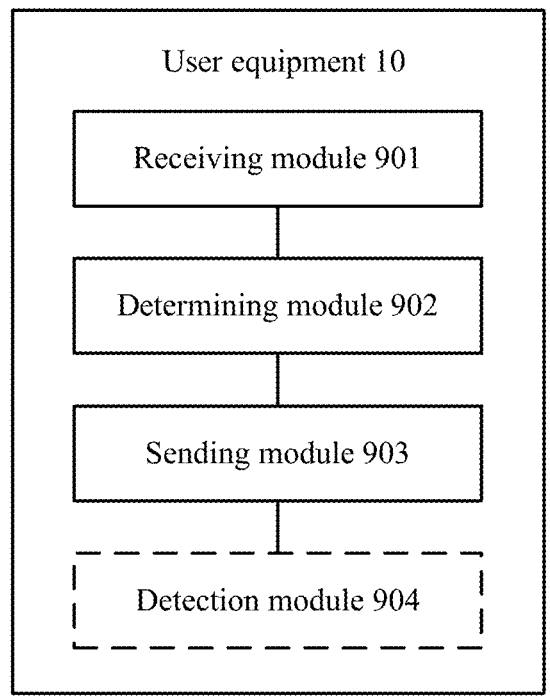
FIG. 9 is a schematic block diagram of user equipment for data transmission according to an embodiment of the present invention.

FIG. 9 is a structural block diagram of user equipment 10 according to an embodiment of the present invention. The user equipment 10 shown in FIG. 9 can be configured to execute processes implemented by the user equipment 10 in the method embodiment in FIG. 3. As shown in FIG. 9, the user equipment 10 includes a receiving module 901, a determining module 902, and a sending module 903.

The receiving module 901 is configured to receive, in a current time period in a first transmission time interval TTI, control information that is carried on a current control channel and that is sent by a base station. The first TTI includes at least two time periods, a data channel corresponding to a control channel that ends in each of the at least two time periods is located in a different TTI, and the control information is configured to schedule a current data channel corresponding to the current control channel;

the determining module 902 is configured to determine, based on the current time period, a second TTI in which a start moment of the current data channel corresponding to the current control channel is located;

the sending module 903 is configured to send data of the current data channel to the eNodeB 20 based on the control information in the second TTI determined by the determining module 902;

the receiving module 901 is further configured to receive, based on the control channel in the second TTI determined by the determining module, data that is of the current data channel and that is sent by the eNodeB 20.

In this way, according to the method for data transmission in the embodiments of the present invention, a time-frequency resource in a system is divided regularly, to reduce overheads of control information that is configured to indicate the time-frequency resource and that is received by the user equipment 10, facilitate resource indication, and improve utilization of the time-frequency resource.

Optionally, in another embodiment, a length of the current control channel is flexible and variable in time domain.

In another embodiment, the time period is a time range between a first reference moment and a second reference moment, and the determining module is specifically configured to:

receive, at the second reference moment or within the time range between the first reference moment and the second reference moment, the control information sent by the base station.

Optionally, in another embodiment, the current data channel includes an uplink data channel or a downlink data channel.

Optionally, in another embodiment, if the receiving module 901 receives, in the $i^{th}$ time period in the at least two time periods, the control information that is carried on the current control channel and that is sent by the base station, the determining module 902 is further configured to:

determine that the second TTI in which the start moment of the downlink data channel corresponding to the current control channel is located is the $k_i^{th}$ TTI after the first TTI, or the second TTI in which the start moment of the uplink data channel corresponding to the current control channel is located is the $m_i^{th}$ TTI after the first TTI, where $k_i$ and $m_i$ are nonnegative integers, i is a positive integer, and different values of i are corresponding to different values of $k_i$ or $m_i$.

Optionally, in another embodiment, the control information on the current control channel includes timing offset indication information, and the timing offset indication information indicates that an offset of a second TTI in which a start moment of the downlink data channel is located is Δk or an offset of a second TTI in which a start moment of the uplink data channel is located is Δm.

If the user equipment receives, in an $i^{th}$ time period in the at least two time periods, the control information that is carried on the current control channel and that is sent by the base station, the determining module 902 is further configured to:

determine that the second TTI in which the start moment of the downlink data channel corresponding to the current control channel is located is the $(k_i+\Delta k)^{th}$ TTI after the first TTI, or the second TTI in which the start moment of the uplink data channel corresponding to the current control channel is located is the $(m_i+\Delta m)^{th}$ TTI after the first TTI, where $k_i$ and $m_i$ are nonnegative integers, i is a positive integer, different values of i are corresponding to different values of $k_i$ or $m_i$, and $\Delta k$ and $\Delta m$ are nonnegative integers.

Optionally, in another embodiment, the UE 10 further includes a detection module 904, and the receiving module 901 is further configured to:

receive control channel indication information sent by the eNodeB 20;

the detection module 904 is configured to detect, based on the control channel indication information received by the receiving module, the control information on at least one control channel ending in at least one time period that includes the current time period and that is indicated by the control channel indication information.

Therefore, the control channel is searched for on some specified control channel time-frequency resources based on an indication of the base station 20, thereby effectively reducing receiving complexity of a system.

It may be clearly understood by a person skilled in the art that, for the purpose of convenient and brief description, for a detailed working process of the foregoing system, apparatus, and unit, refer to a corresponding process in the foregoing method embodiments, and details are not described herein.

Figure 10:
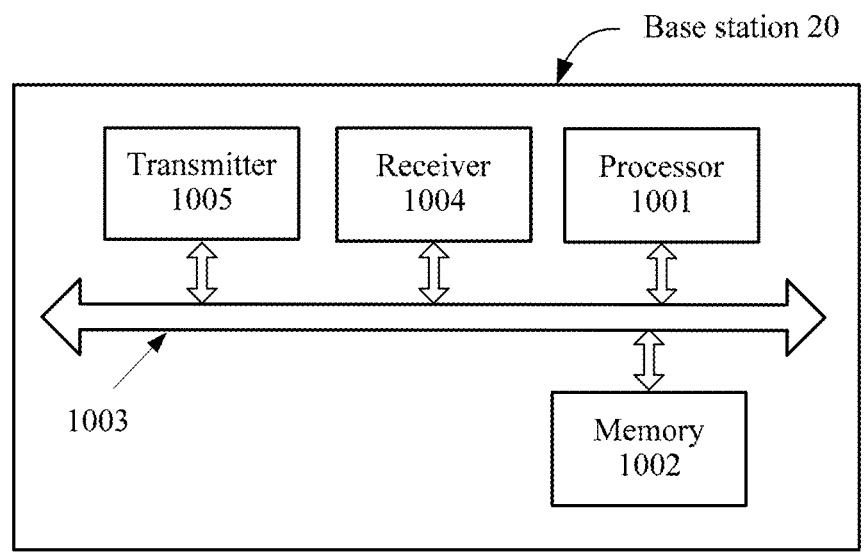
FIG. 10 is a schematic block diagram of a base station for data transmission according to an embodiment of the present invention.

As shown in FIG. 10, an embodiment of the present invention further provides a base station 20. The base station 20 includes a processor 1001, a memory 1002, a bus system 1003, a receiver 1004, and a transmitter 1005. The processor 1001, the memory 1002, and the receiver 1004 are connected by using the bus system 1003. The memory 1002 is configured to store an instruction, and the processor 1001 is configured to execute the instruction stored in the memory 1002, and control the receiver 1004 to receive information. The processor 1001, the memory 1002, the bus system 1003, the receiver 1004, and the transmitter 1005 may be implemented by using one or more chips. For example, the processor 1001, the memory 1002, the bus system 1003, the receiver 1004, and the transmitter 1005 may be fully integrated into one or more chips, or the processor 1001, the bus system 1003, the receiver 1004, and the transmitter 1005 may be integrated into one chip, and the memory 1002 is integrated into another chip. A specific form is not limited herein. The processor 1001 is configured to:

determine a current time period in which an end moment of a current control channel is located in a first transmission time interval TTI, where the first TTI includes at least two time periods, and a start moment of a data channel corresponding to a control channel that ends in each of the at least two time periods is located in a different TTI;

the transmitter 1005 is configured to send, to user equipment in the first TTI determined by the processor 1001, control information carried on the current control channel. The control information is configured to schedule a current data channel corresponding to the current control channel;

the processor 1001 is further configured to determine, based on the current time period, a second TTI in which a start moment of the current data channel is located;

the transmitter 1005 is further configured to send data of the current data channel to the user equipment 10 in the second TTI determined by the processor 1001;

the receiver 1004 is configured to receive, in the second TTI determined by the processor 1001, data that is of the current data channel and that is sent by the user equipment 10.

Figure 11:
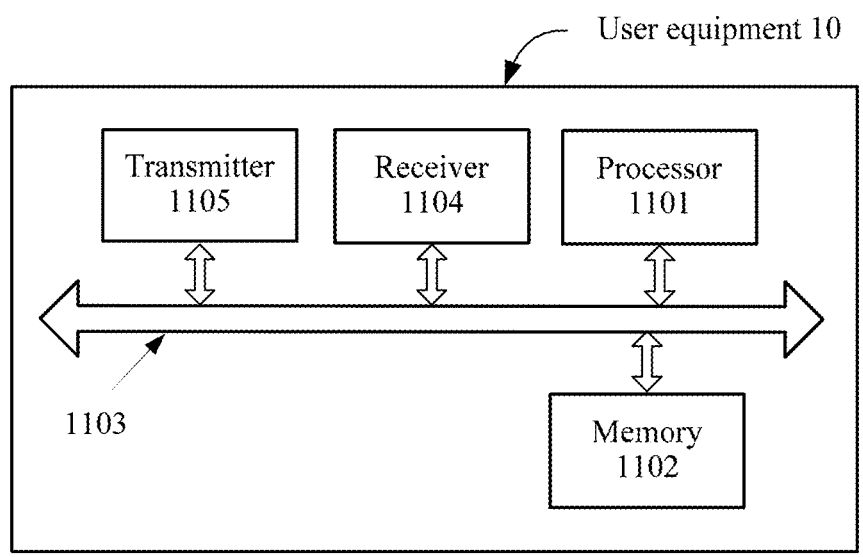
FIG. 11 is a schematic block diagram of user equipment for data transmission according to an embodiment of the present invention.

As shown in FIG. 11, an embodiment of the present invention further provides a user equipment 10. The user equipment 10 includes a processor 1101, a memory 1102, a bus system 1103, a receiver 1104, and a transmitter 1105. The processor 1101, the memory 1102, and the receiver 1104 are connected by using the bus system 1103. The memory 1102 is configured to store an instruction, and the processor 1101 is configured to execute the instruction stored in the memory 1102, and control the receiver 1104 to receive information. The processor 1101, the memory 1102, the bus system 1103, the receiver 1104, and the transmitter 1105 may be implemented by using one or more chips. For example, the processor 1101, the memory 1102, the bus system 1103, the receiver 1104, and the transmitter 1105 may be fully integrated into one or more chips, or the processor 1101, the bus system 1103, the receiver 1104, and the transmitter 1105 may be integrated into one chip, and the memory 1102 is integrated into another chip. A specific form is not limited herein. The receiver 1104 is configured to:

receive, in a current time period in a first transmission time interval TTI, control information that is carried on a control channel and that is sent by a base station, where the first TTI includes at least two time periods, a data channel corresponding to a control channel that ends in each of the at least two time periods is located in a different TTI, and the control information is configured to schedule a current data channel corresponding to the current control channel;

the processor 1101 is further configured to determine, based on the current time period, a second TTI in which a start moment of the current data channel corresponding to the current control channel is located;

the transmitter 1105 is configured to send data of the current data channel to the base station 20 based on the control information in the second TTI determined by the processor 1101;

the receiver 1104 is further configured to receive, based on the control information in the second TTI determined by the processor 1101, data that is of the current data channel and that is sent by the base station 20.

It should be noted that, the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example and not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory in the system and method described in this specification aims to include but is not limited to these memories and any other proper type of memory.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for data transmission, the method comprising:
    determining, by a base station, a first time period in which an end moment of a first control channel is located in a first transmission time interval (TTI), wherein the first TTI comprises at least two time periods, and a start moment of a data channel corresponding to a control channel that ends in each of the at least two time periods is located in a different TTI;
    sending, by the base station to a terminal in the first TTI, control information carried on the first control channel, wherein the control information is configured to schedule a first data channel corresponding to the first control channel;
    determining, by the base station based on the first time period, a second TTI in which a start moment of the first data channel is located; and
    exchanging, by the base station, data of the first data channel with the terminal in the second TTI.

2. The method according to claim 1, wherein a length of the first control channel is flexible and variable in time domain.

3. The method according to claim 1, wherein the first data channel comprises an uplink data channel or a downlink data channel.

4. The method according to claim 3, wherein the control information carried on the first control channel comprises timing offset indication information, the timing offset indication information indicates that an offset of the second TTI in which the start moment of the downlink data channel is located is $\Delta k$ or an offset of the second TTI in which the start moment of the uplink data channel is located is $\Delta m$,
    wherein if the base station determines that the first time period in which the end moment of the first control channel is located is the $i^{th}$ time period in the at least two time periods, the determining, by the base station based on the first time period, the second TTI in which the start moment of the first data channel is located comprises:
    determining, by the base station, that the second TTI in which the start moment of the downlink data channel corresponding to the first control channel is located is the $(k_i+\Delta k)^{th}$ TTI after the first TTI, or the second TTI in which the start moment of the uplink data channel corresponding to the first control channel is located is the $(m_i+\Delta m)^{th}$ TTI after the first TTI, wherein $k_i$ and $m_i$ are nonnegative integers, i is a positive integer, different values of i are corresponding to different values of $k_i$ or and $\Delta k$ and $\Delta m$ are nonnegative integers.

5. The method according to claim 1, further comprising:
    sending, by the base station, control channel indication information to the terminal, wherein the control channel indication information is configured to instruct the terminal to detect the control information on at least one control channel that ends in at least one time period comprising the first time period.

6. A base station, comprising:
    a receiver;
    a processor, configured to determine a first time period in which an end moment of a first control channel is located in a first transmission time interval (TTI), wherein the first TTI comprises at least two time periods, and a start moment of a data channel corresponding to a control channel that ends in each of the at least two time periods is located in a different TTI; and a transmitter, configured to send, to a terminal in the first TTI, control information carried on the first control channel, wherein the control information is configured to schedule a first data channel corresponding to the first control channel;

wherein the processor is further configured to determine, based on the first time period, a second TTI in which a start moment of the first data channel is located;

wherein the transmitter is further configured to send data of the first data channel to the terminal in the second TTI determined by the processor; or wherein the receiver is configured to receive, in the second TTI determined by the processor, data that is of the first data channel and that is sent by the terminal.

7. The base station according to claim 6, wherein a length of the first control channel is flexible and variable in time domain.

8. The base station according to claim 6, wherein the first data channel comprises an uplink data channel or a downlink data channel.

9. The base station according to claim 8, wherein the control information carried on the first control channel comprises timing offset indication information, the timing offset indication information indicates that an offset of the second TTI in which the start moment of the downlink data channel is located is $\Delta k$ or an offset of the second TTI in which the start moment of the uplink data channel is located is $\Delta m$, and wherein if the processor determines that the first time period in which the end moment of the first control channel is located is the $i^{th}$ time period in the at least two time periods, the processor is further configured to:

determine that the second TTI in which the start moment of the downlink data channel corresponding to the first control channel is located is the $(k_i+\Delta k)^{th}$ TTI after the first TTI, or the second TTI in which the start moment of the uplink data channel corresponding to the first control channel is located is the $(m_i+\Delta m)^{th}$ TTI after the first TTI, wherein $k_i$ and $m_i$ are nonnegative integers, i is a positive integer, different values of i are corresponding to different values of $k_i$ or $m_i$, and $\Delta k$ and $\Delta m$ are nonnegative integers.

10. The base station according to claim 6, wherein the control information carried on the first control channel comprises at least one of the following: resource indication information, modulation and coding information, power control indication information, process number indication information, or redundancy version information.

11. The base station according to claim 6, wherein the transmitter is further configured to:

send control channel indication information to the terminal, wherein the control channel indication information instructs the terminal to detect the control information on at least one control channel that ends in at least one time period comprising the first time period.

12. A terminal, comprising:

a receiver, configured to receive, in a first time period in which an end moment of a first control channel is located in a first transmission time interval (TTI), control information that is carried on the first control channel and that is sent by a base station, wherein the first TTI comprises at least two time periods, a start moment of a data channel corresponding to a control channel that ends in each of the at least two time periods is located in a different TTI, and the control information is configured to schedule a first data channel corresponding to the first control channel;

a processor, configured to determine, based on the first time period, a second TTI in which a start moment of the first data channel corresponding to the first control channel is located; and a transmitter, configured to send data of the first data channel to the base station based on the control information in the second TTI determined by the processor; or wherein the receiver is further configured to receive, based on the control information in the second TTI determined by the processor, data that is of the first data channel and that is sent by the base station.

13. The terminal according to claim 12, wherein a length of the first control channel is flexible and variable in time domain.

14. The terminal according to claim 12, wherein the first data channel comprises an uplink data channel or a downlink data channel.

15. The terminal according to claim 14, wherein the control information carried on the first control channel comprises timing offset indication information, the timing offset indication information indicates that an offset of the second TTI in which the start moment of the downlink data channel is located is $\Delta k$ or an offset of the second TTI in which the start moment of the uplink data channel is located is $\Delta m$, and wherein if the terminal receives, in the $i^{th}$ time period in the at least two time periods and the $i^{th}$ time period is a time period in which the end moment of the first control channel is located, the control information that is carried on the first control channel and that is sent by the base station, the processor is further configured to:

determine that the second TTI in which the start moment of the downlink data channel corresponding to the first control channel is located is the $(k_i+\Delta k)^{th}$ TTI after the first TTI, or the second TTI in which the start moment of the uplink data channel corresponding to the first control channel is located is the $(m_i+\Delta m)^{th}$ TTI after the first TTI, wherein $k_i$ and $m_i$ are nonnegative integers, i is a positive integer, different values of i are corresponding to different values of $k_i$ or and $\Delta k$ and $\Delta m$ are nonnegative integers.

16. The terminal according to claim 12, wherein the control information carried on the first control channel comprises at least one of the following: resource indication information, modulation and coding information, power control indication information, process number indication information, or redundancy version information.

17. The terminal according to claim 12, wherein the receiver is further configured to receive control channel indication information sent by the base station; and wherein the processor is configured to detect, based on the control channel indication information received by the receiver, the control information on at least one control channel ending in at least one time period that comprises the first time period and that is indicated by the control channel indication information.

18. The base station according to claim 6, wherein the first control channel is located in one or more consecutive time periods.

19. The terminal according to claim 12, wherein the first control channel is located in one or more consecutive time periods.

20. The terminal according to claim 12, wherein the first data channel is located in one or more consecutive TTIs.

* * * * *

UNITED STATES PATENT AND TRADEMARK OFFICE
CERTIFICATE OF CORRECTION

PATENT NO. : 10,834,707 B2
APPLICATION NO. : 16/146190
DATED : November 10, 2020
INVENTOR(S) : Hua et al.

Page 1 of 1

It is certified that error appears in the above-identified patent and that said Letters Patent is hereby corrected as shown below:

In the Claims

Claim 4: Column 24, Line 50: "$k_i$ or and" should read -- $k_i$ or $m_i$, and --.

Claim 15: Column 26, Line 43: "sponding to different values of $k_i$ or and" should read -- sponding to different values of $k_i$ or $m_i$, and --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*